(12) United States Patent
Ito et al.

(10) Patent No.: US 9,198,247 B2
(45) Date of Patent: Nov. 24, 2015

(54) VEHICLE LAMP, DRIVING DEVICE THEREOF, AND CONTROL METHOD THEREOF

(71) Applicant: KOITO MANUFACTURING CO., LTD., Tokyo (JP)

(72) Inventors: Masayasu Ito, Shizuoka (JP); Takao Muramatsu, Shizuoka (JP); Syouhei Yanagizu, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 14/620,335

(22) Filed: Feb. 12, 2015

(65) Prior Publication Data

US 2015/0230302 A1 Aug. 13, 2015

(30) Foreign Application Priority Data

Feb. 12, 2014 (JP) .................................. 2014-024759

(51) Int. Cl.
H05B 33/02 (2006.01)
H05B 33/08 (2006.01)
H05B 37/02 (2006.01)

(52) U.S. Cl.
CPC ........ H05B 33/0815 (2013.01); H05B 33/0827 (2013.01); H05B 37/0209 (2013.01)

(58) Field of Classification Search
CPC ........... H05B 33/0815; H05B 33/0827; H05B 33/0818; H05B 33/0845; H05B 37/0209; H05B 37/0281

USPC ........... 315/77, 76–83, 185 R–193, 219–226; 323/222, 223, 224, 265, 266, 271

See application file for complete search history.

(56) References Cited

U.S. PATENT DOCUMENTS

| | | | |
|---|---|---|---|
| 6,678,173 B2 * | 1/2004 | Nakagawa | 363/44 |
| 7,352,135 B2 * | 4/2008 | Shiotsu et al. | 315/247 |
| 7,741,788 B2 * | 6/2010 | Ito et al. | 315/247 |
| 7,777,429 B2 * | 8/2010 | Ichikawa et al. | 315/308 |
| 7,792,166 B2 * | 9/2010 | Borschowa | 372/38.04 |
| 8,106,634 B2 * | 1/2012 | Hojo et al. | 323/222 |
| 8,179,110 B2 * | 5/2012 | Melanson | 323/282 |
| 8,305,011 B2 * | 11/2012 | Kitagawa et al. | 315/307 |
| 8,624,513 B2 * | 1/2014 | Moss | 315/193 |
| 8,710,769 B2 * | 4/2014 | Muramatsu et al. | 315/307 |

(Continued)

FOREIGN PATENT DOCUMENTS

JP 2007-126041 A 5/2007

*Primary Examiner* — Alexander H Taningco
*Assistant Examiner* — Nelson Correa
(74) *Attorney, Agent, or Firm* — Sughrue Mion, PLLC

(57) ABSTRACT

A current controller 42 compares a first coil current $I_{L1}$ flowing in an output inductor L1 with a first upper threshold value and a first lower threshold value. A current limiter 44 compares a second coil current $I_{L2}$ flowing in an input inductor L2 with a second upper threshold value and a second lower threshold value. A duty controller 46 (i) switches a switching transistor M1 based on the first coil current in a cycle where the first coil current $I_{L1}$ exceeds the first upper threshold value before the second coil current $I_{L2}$, exceeds the second upper threshold value. According to the current controller 42, it is possible to stabilize an output current and to limit a current.

7 Claims, 10 Drawing Sheets

(56) References Cited

U.S. PATENT DOCUMENTS

| | | | |
|---|---|---|---|
| 8,749,149 B2 * | 6/2014 | Naruo et al. | 315/186 |
| 8,830,702 B2 * | 9/2014 | Macfarlane | 363/17 |
| 8,994,287 B2 * | 3/2015 | Ito et al. | 315/224 |
| 9,024,598 B2 * | 5/2015 | Hasegawa et al. | 323/272 |
| 2007/0103098 A1 | 5/2007 | Shiotsu et al. | |
| 2011/0163680 A1 * | 7/2011 | Welten | 315/186 |
| 2014/0001969 A1 * | 1/2014 | Tateishi et al. | 315/186 |

* cited by examiner

VEHICLE LAMP, DRIVING DEVICE THEREOF, AND CONTROL METHOD THEREOF

CROSS-REFERENCE TO RELATED APPLICATION

The present application claims the benefit of priority of Japanese Patent Applications No. 2014-024759, filed on Feb. 12, 2014, which is incorporated herein by reference.

TECHNICAL FIELD

The present invention relates to a vehicle lamp used in a vehicle or the like.

BACKGROUND ART

As a light source of a vehicle lamp, substitutions of a semiconductor device such as a light emitting diode (LED) or a laser diode (LD) for a halogen lamp or a high-intensity discharge lamp in the related art have progressed. A drive circuit that drives such a semiconductor light source (hereinafter, referred to simply as a light source) includes a converter that boosts and drops an input voltage such as a battery voltage, and supplies the voltage to the light source and a controller that controls the converter. The controller detects an output current of the converter, and performs a feedback control of a switching of the converter such that the output current approaches a current value corresponding to target luminance.

FIG. 1 is a diagram illustrating a configuration of a vehicle lamp in the related art. FIGS. 2A and 2B are operation waveform diagrams of a vehicle lamp $1r$. Referring to FIG. 1, the vehicle lamp $1r$ includes a light source 10 and a driving device $20r$. A voltage $V_{BAT}$ of a battery 2 is input to the vehicle lamp $1r$ via a switch 4.

The driving device $20r$ includes a converter 30 and a controller $40r$. The converter 30 is, for example, a step-down converter, and drops an input voltage $V_{IN}$ and supplies the voltage to the light source 10 which is a load. The converter 30 mainly includes an input capacitor C11, a switching transistor M11, a rectifier diode D11, an inductor L11, and an output capacitor C12.

The controller $40r$ detects an output current $I_{OUT}$ flowing in the light source 10 and controls a duty ratio of the switching of the switching transistor M11 such that the output current $I_{OUT}$ approaches a target amount corresponding to the luminance. A current sense resistor R11 is provided on a path of a coil current $I_{L11}$ in order to detect the coil current $I_{L11}$ corresponding to the output current $I_{OUT}$. In the current sense resistor (hereinafter, referred to simply as sense resistor) R11, a voltage drop (hereinafter, referred to as simply sense voltage) $V_{R11}$ which is proportional to a coil current $I_{L11}$ occurs.

The coil current $I_{L11}$ is a pulsating current according to the switching of the switching transistor M11, and the output current $I_{OUT}$ is the current obtained by smoothing the coil current $I_{L11}$. The controller $40r$ stabilizes the coil current $I_{L11}$ within a target range by a so-called hysteresis control. The controller $40r$ turns OFF the switching transistor M11 when the sense voltage $V_{R11}$ reaches the upper threshold value $I_{REFH}$ of the target range, and turns ON the switching transistor M11 when the sense voltage $V_{R11}$ drops to the lower threshold value $I_{REFL}$ of the target range. An aspect of the coil current $I_{L11}$ is stabilized within the target range is illustrated in FIG. 2A.

PRIOR ART DOCUMENT

Patent Document

Patent Document 1: JP-A-2007-126041

SUMMARY OF THE INVENTION

Problem to be Solved by the Invention

In order to improve the reliability of a driving device $20r$, an over current protection is required. Therefore, a controller $40r$ compares an input current $I_{M11}$ flowing in the switching transistor M11 with a predetermined threshold value (all referred to as a current limit value) $i_{PEAK}$, turns OFF the switching transistor M11 when the current $I_{M1}$ reaches the threshold value $I_{PEAK}$, and limits the input current. Specifically, a sense resistor R12 is provided on the path of the current $I_{M11}$ that flows in the switching transistor M11. In the sense resistor R12, a voltage drop (sense voltage) which is proportional to the current $I_{M11}$ occurs. The controller $40r$ compares the sense voltage $V_{R12}$ with a threshold value voltage $V_{PEAK}$ corresponding to the predetermined threshold value $I_{PEAK}$, and turns OFF the switching transistor M11 when the $V_{R12}$ is greater than the $W_{PEAK}$.

As a result of the investigation of the vehicle lamp $1r$ in FIG. 1, the present inventor comes to recognize following problems.

In FIG. 2B, an operation waveform is illustrated in a state that the current limit is applied. At a point in time to, the $I_{L11}$ decreases to lower threshold value $I_{REFL}$ and the switching transistor M11 is turned ON. At a point in time t1 immediately thereafter, when the input current $I_{M11}$ reaches a peak value $I_{PEAK}$, the switching transistor M11 is turned OFF. When this cycle continues, the switching frequency becomes high compared to that in FIG. 2A. Considering that a vehicle lamp 1 is mounted on a vehicle, switching noise of a few MHz interferes with other devices mounted on the vehicle (electromagnetic interference: EMI). In addition, when the switching frequency increases, a switching loss in the DC/DC converter 30 increases. Therefore, the efficiency decreases or the reliability of the circuit element is affected.

In order to solve this problem, when the input current $I_{M11}$ reaches the peak value $I_{PEAK}$, a control for sustaining the OFF state of the switching transistor M11 during a predetermined OFF time can be considered. However, in this case, a dedicated circuit is required. In addition, when the OFF time becomes long, the increase of the switching frequency in the current limit state can be suppressed, but it is difficult to stabilize the output current $I_{OUT}$ within the target range.

The present invention has been made in view of this situation and one exemplary object of an aspect of the present invention is to provide a vehicle lamp and the driving device thereof in which the output current can be stabilized and the current can be limited.

Means for Solving the Problem

An aspect of the present invention relates to a driving device that is used together with a light source and configures a vehicle lamp. The driving device includes: a DC/DC converter that receives an input voltage and supplies a drive voltage to the light source; and a controller that controls the DC/DC converter. The DC/DC converter includes: an input terminal, an output terminal, and a ground line; a switching transistor and an input inductor that are provided in series between the input terminal and the ground line, and an output inductor. The controller includes: a current controller that compares a first coil current which flows in the output inductor with a first upper threshold value and a first lower threshold value; a current limiter that compares a second coil current which flows in the input inductor with a second upper threshold value and a second lower threshold value; and a duty controller that, (i) in a cycle where the first coil current exceeds the first upper threshold value before the second coil current exceeds the second upper threshold value, (i-a) turns OFF the switching transistor triggered by the fact that the first coil current exceeds the first upper threshold value, and (i-b) turns ON the switching transistor triggered by the fact that the first coil current comes below the first lower threshold value, and (ii) in a cycle where the second coil current exceeds the second upper threshold value before the first coil current exceeds the first upper threshold value, (ii-a) turns OFF the switching transistor triggered by the fact that the second coil current exceeds the second upper threshold value, and (ii-b) turns ON the switching transistor triggered by the fact that the second coil current comes below the second lower threshold value.

According to this aspect, immediately after the first coil current reaches the first upper threshold value and the switching transistor is turned OFF, even though the second coil current decreases to the second lower threshold value, the switching transistor is not turned ON right away, but the OFF state of the switching transistor is continued until the first coil current decreases to the first lower threshold value. On the contrary, immediately after the second coil current reaches the second upper threshold value and the switching transistor is turned OFF, even though the first coil current decreases to the first lower threshold value, the switching transistor is not turned ON right away, but the OFF state of the switching transistor is continued until the second coil current decreases to the second lower threshold value. In this way, it is possible to suppress the increase of the switching frequency.

The current controller may include a first hysteresis comparator that compares the first detected voltage that corresponds to the first coil current with the first threshold voltage value which transits at two voltage levels which respectively correspond to the first upper threshold value and the first lower threshold value, and generates a control signal which is asserted while the first detected voltage is lower than the first threshold voltage value. The current limiter may include a second hysteresis comparator that compares the second detected voltage that corresponds to the second coil current with the second threshold voltage value which transits at two voltage levels which respectively correspond to the second upper threshold value and the second lower threshold value, and generates a limit signal which is asserted while the second detected voltage is lower than the second threshold voltage value. The duty controller may include a logic circuit that generates the pulse signal which is asserted while both the control signal and the limit signal are asserted, and is negated while at least one of the control signal and the limit signal are negated. According to this configuration, it is possible to appropriately control the switching transistor with a simple configuration.

When an output power of the DC/DC converter is $P_{OUT}$ and an input voltage is $V_{IN}$, in accordance with the $P_{OUT}/V_{IN}$ increases, the second upper threshold value and the second lower threshold value may increase. According to this aspect, in the DC/DC converter that stabilizes the output current, it is possible to suppress an oscillation state in which the control state by the current controller and the limit state by the current limiter frequently and alternately transit.

The current limiter may further include: a first V/I (voltage/current) converter that generates a first current which corresponds to the input voltage $V_{IN}$; and a second V/I converter that generates a second current that corresponds to the output voltage $V_{OUT}$ of the DC/DC converter. The current limiter may be configured such that the first hysteresis comparator can be offset according to the first current and the second current. In this case, it is possible to control a priority of the current control and the current limit according to the input voltage $V_{IN}$ and the output voltage $V_{OUT}$.

The DC/DC converter may further include a series capacitor that is provided between the input terminal and the output terminal. The DC/DC converter may be a Cuk converter, a Sepic converter, or a Zeta converter.

Another aspect of the present invention relates to a vehicle lamp. The vehicle lamp may include: a light source that includes a plurality of light emitting elements connected in series; the driving device according to any one of Claims 1 to 5 that drives the light source; and at least one bypass switch that is associated with at least one of the plurality of light emitting elements, and is provided respectively in parallel with corresponding light emitting elements. In this case, a load fluctuation of the DC/DC converter occurs according to the ON and the OFF states of the bypass switch, and the frequency in which the current limit is applied increases. In this case, by using the driving device described above, both the stable current control and the current limit can be achieved.

Advantage of the Invention

According to an embodiment of the present invention, it is possible to stabilize an output current and apply a current limit.

DETAILED DESCRIPTION

Figure 1:
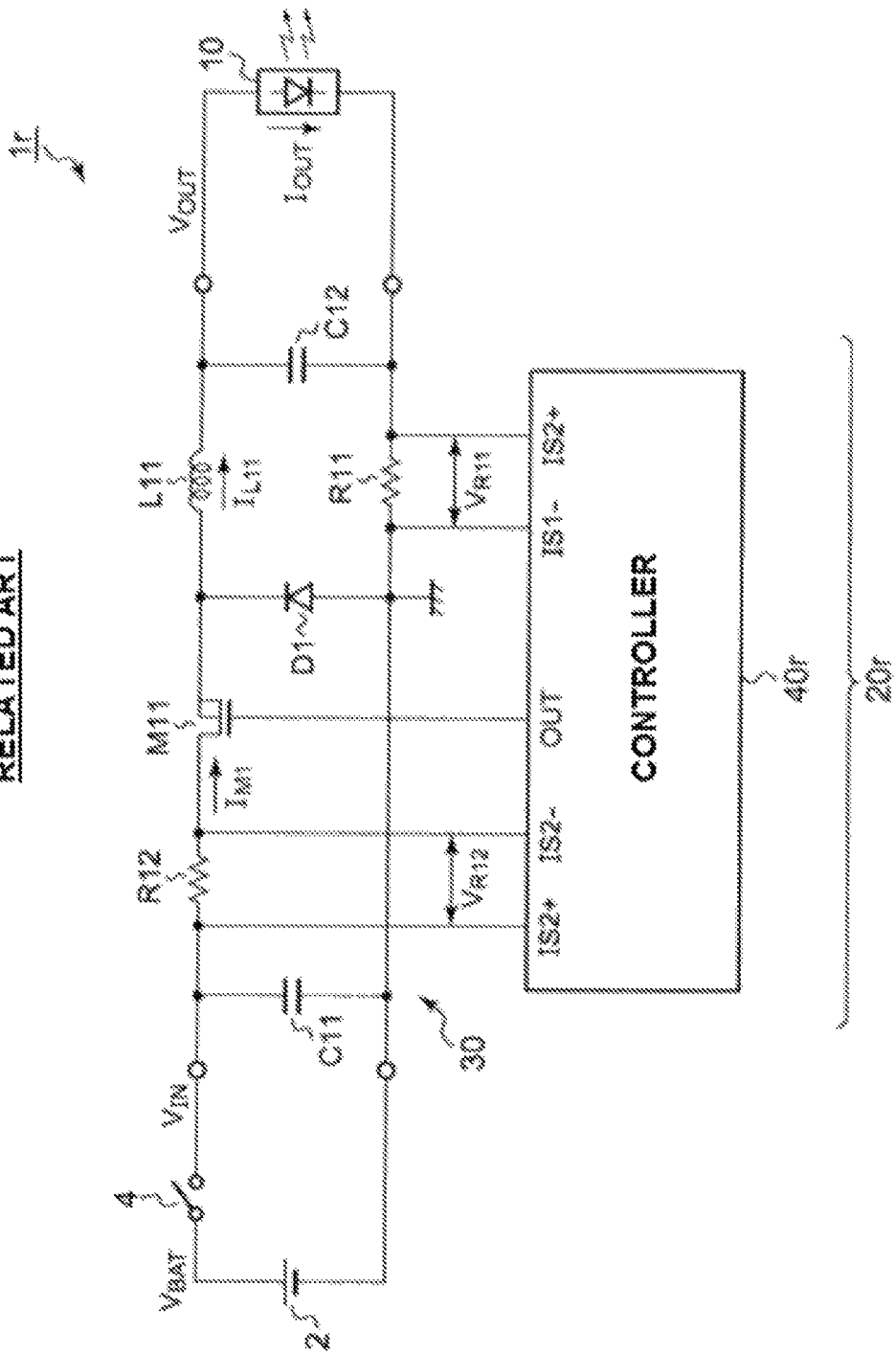
FIG. 1 is a diagram illustrating a configuration of a vehicle lamp in the related art.
Figure 2A:
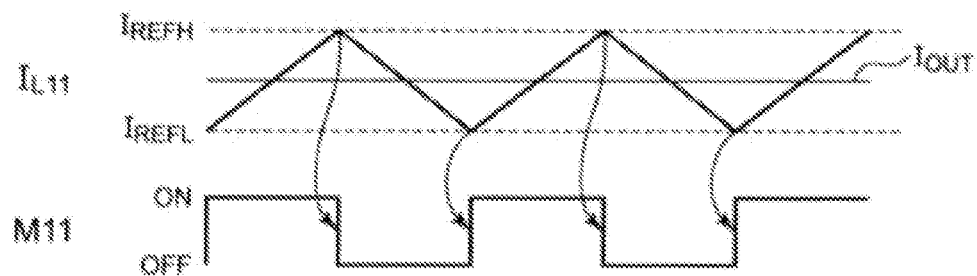
FIG. 2A is operation waveform diagram of the vehicle lamp.
Figure 2B:
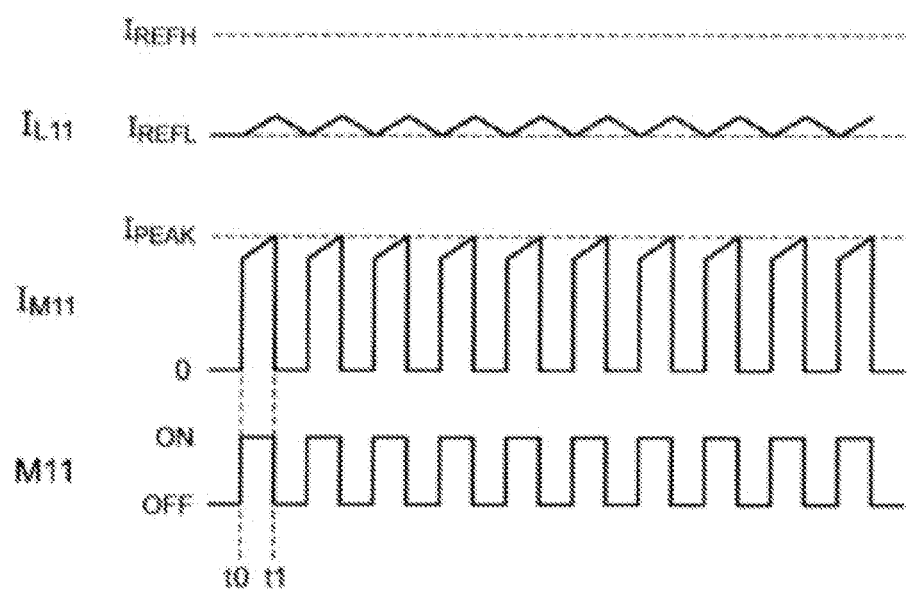
FIG. 2B is operation waveform diagram of the vehicle lamp.

Hereinafter, a preferred embodiment of the present invention will be described with reference to the drawings. The same or equivalent configuration elements, members, and processing tasks will be referred to by the same reference numerals or signs and the description thereof will not be repeated. In addition, the embodiment is just an example and does not limit the invention, and all of the features, the characteristics, and the combinations thereof are not necessarily essential to the invention.

In this Specification, "a state in which a member A is connected to a member B" includes a case where the member A and the member B are physically and directly connected, and a case where the member A and the member B are indirectly connected via another member, in which the electrically connected state is not substantially affected or a function or an effect achieved by the binding is not impaired. Similarly, "a state in which a member C is provided between the member A and the member B" includes a case where the member A and the member C, or the member B and the member C are directly connected, and a case where the member A and the member C, or the member B and the member C are indirectly connected via another member, in which the electrically connected state is not substantially affected or a function or an effect achieved by the binding is not impaired.

In this Specification, reference numerals or signs given to electrical signals such as a voltage signal, a current signal, or the like, or circuit elements such as a resistor, a capacitor, or the like are assumed to respectively represent a voltage value, a current value, or a resistance value, or a capacitance value, if necessary.

Figure 3:
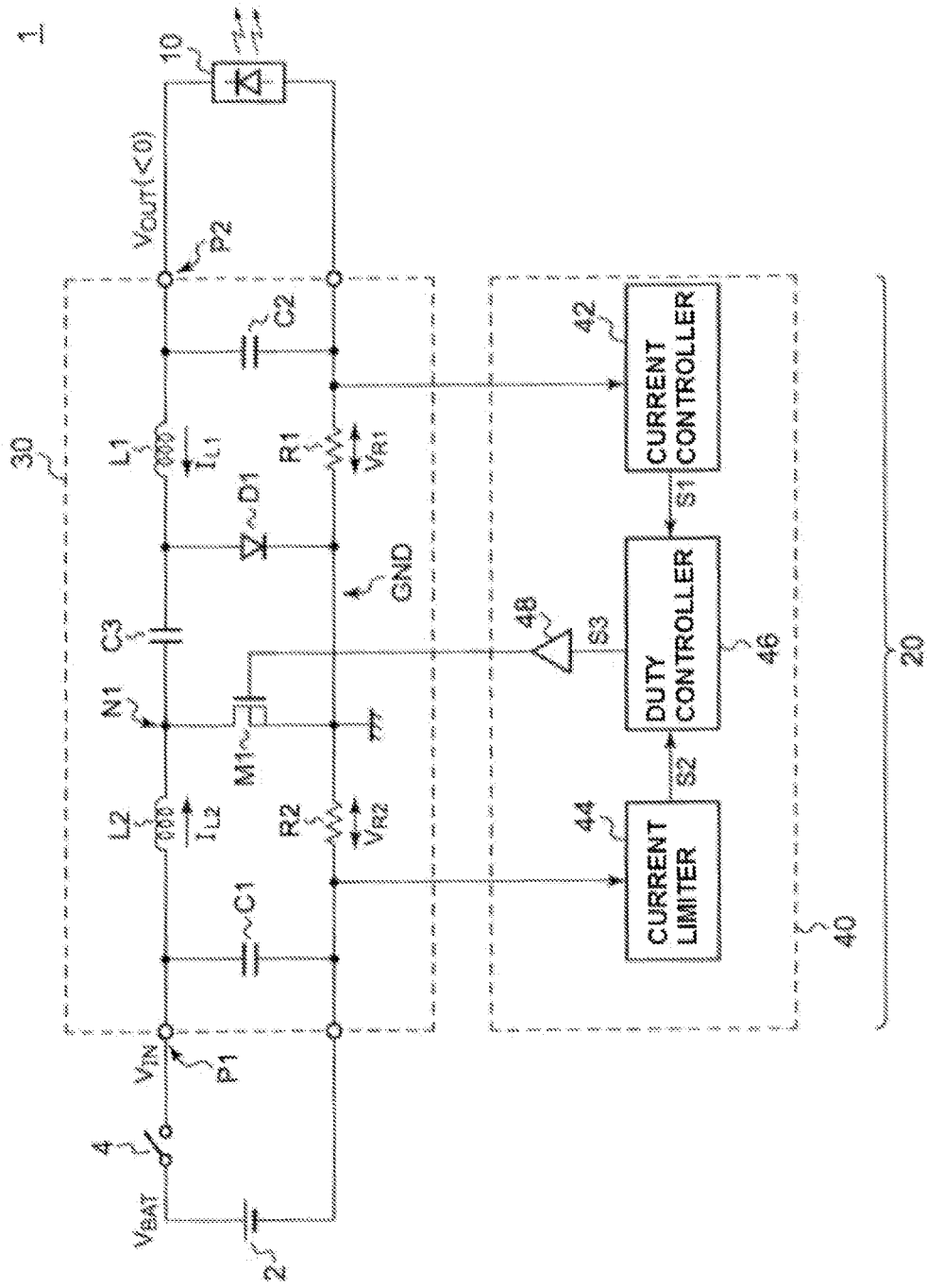
FIG. 3 is a block diagram of the vehicle lamp that includes a driving device in the embodiment.

FIG. 3 is a block diagram of a vehicle lamp 1 that includes a driving device 20. The driving device 20, as similar to FIG. 1, is used together with a light source 10 to configure the vehicle lamp 1 as a whole.

The driving device 20 includes a DC/DC converter 30 and a controller 40. The DC/DC converter 30 receives an input voltage $V_{IN}$ and supplies a drive voltage $V_{OUT}$ to the light source 10. The controller 40 controls the DC/DC converter 30.

The DC/DC converter 30 includes an input terminal P1 that receives the input voltage $V_{IN}$, an output terminal P2 to which the light source 10 that is a load is connected and a ground line GND by which the light source 10 is grounded. The ground line GND connects a ground terminal in the input side and a ground terminal in the output side. In the present invention, a topology of the DC/DC converter 30 is not particularly limited, but a condition of the configuration is to include a switching transistor M1, an input inductor L2, and an output inductor L1. As the topology for satisfying this condition, a Cuk converter in FIG. 3 is exemplified. The Cuk converter includes an input capacitor C1, an output capacitor C2, a series capacitor C3, and a rectifier diode D1 in addition to the switching transistor M1, the output inductor L1, and the input inductor L2.

The input capacitor C1 is provided between the input terminal P1 and the ground line GND and stabilizes the input voltage $V_{IN}$. The input inductor L2 and the switching transistor M1 are provided in series between the input terminal P1 and the ground line GND. The output capacitor C2 is provided between the output terminal P2 and the ground line GND and stabilizes the output voltage $V_{OUT}$. The input capacitor C1 and the output capacitor C2 may be omitted.

A cathode of the rectifier diode D1 is connected to the ground line GND. One end of the series capacitor C3 is connected to an anode of the rectifier diode D1 and the other end is connected to a connection node N1 of the switching transistor M1 and the input inductor L2. One end of the output inductor L1 is connected to the anode of the rectifier diode D1 and the other end is connected to the output terminal P2.

The configuration of the DC/DC converter 30 is as described above. Next, the controller 40 will be described. The controller 40 includes a current controller 42, a current limiter 44, a duty controller 46, and a driver 48.

The current controller 42 is provided for stabilizing the first coil current $I_{L1}$ flowing in the output inductor L1 within the target range according to a target luminance of the light source 10. Specifically, the current controller 42 compares the first coil current $I_{L1}$ flowing in the output inductor L1 with a first upper threshold value $I_{REFH}$ and a first lower threshold value $I_{REFL}$, and generates a control signal S1 that indicates the comparison result.

The current limiter 44 is provided for limiting the current such that the second coil current $I_{L2}$ flowing in the input inductor L2 does not exceed a current limit value $I_{PEAK}$ which is determined from the view of reliability of the circuit. The current limit value $I_{PEAK}$ is set higher than a second coil current $I_{L2\_NORM}$ at the normal state and lower than a maximum rated current $I_{MAX}$ of the elements on the path where the second coil current $I_{L2}$ flows. The current limiter 44 compares the second coil current $I_{L2}$, flowing in the input inductor L2 with a second upper threshold value $I_{PEAK}$ and a second lower threshold value $I_{PEAKL}$, and generates a limit signal S2 that indicates the comparison result.

A method of current detection of the current controller 42 and the current limiter 44 is not particularly limited, but in the present embodiment, in order to detect a current flowing in the output inductor L1 (the first coil current $I_{L1}$) and a current flowing in the input inductor L2 (the second coil current $I_{L2}$), a first sense resistor R1 and a second sense resistor R2 are provided on the path of the coil current subject to being detected. In the first sense resistor R1 and the second sense resistor R2, there occur voltage drops (detected voltages) $V_{R1}$ and $V_{R2}$ that are proportional to the coil currents $I_{L1}$ and $I_{L2}$ subject to being detected. The current controller 42 compares the first detected voltage $V_{R1}$ with the voltage threshold values $V_{REFH}$ and $V_{REFL}$ which correspond to $I_{REFH}$ and $I_{REFL}$. Similarly, the current limiter 44 compares the second detected voltage $V_{R2}$ with the voltage threshold values $V_{PEAKH}$ and $V_{PEAKL}$ which correspond to $I_{PEAKH}$ and $I_{PEAKL}$.

(i) In a cycle where the first coil current $I_{L1}$ exceeds the first upper threshold value $I_{REFH}$ before the second coil current $I_{L2}$, exceeds the second upper threshold value $I_{PEAKH}$, (i-a) the duty controller 46 turns OFF the switching transistor M1 triggered by the fact that the first coil current $I_{L1}$ exceeds the first upper threshold value $I_{REFH}$, and (i-b) turns ON the switching transistor M1 triggered by the fact that the first coil current $I_{L1}$ comes below the first lower threshold value $I_{REFL}$. In addition, (ii) in a cycle where the second coil current $I_{L2}$, exceeds the second upper threshold value $I_{PEAKH}$ before the first coil current $I_{L1}$ exceeds the first upper threshold value $I_{REFH}$, (ii-a) the duty controller 46 turns OFF the switching transistor M1 triggered by the fact that the second coil current $I_{L2}$, exceeds the second upper threshold value $I_{PEAKH}$, and (ii-b) turns ON the switching transistor M1 triggered by the fact that the second coil current $I_{L2}$, comes below the second lower threshold value $I_{PEAKL}$.

The duty controller 46 outputs a pulse signal S3 that instructs the ON and the OFF of the switching transistor M1. The driver 48 switches the switching transistor M1 based on the pulse signal S3.

Figure 4A:
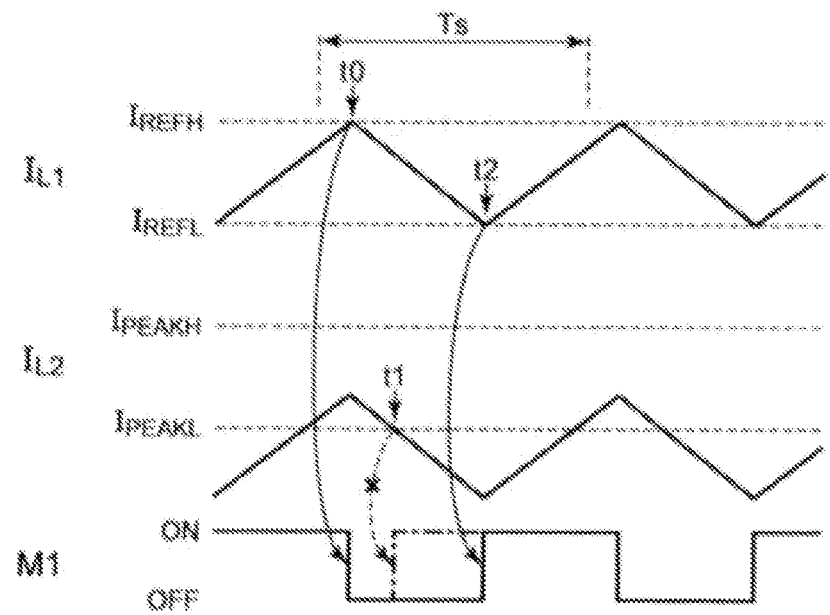
FIG. 4A is operation waveform diagram of the driving device in FIG. 3.
Figure 4B:
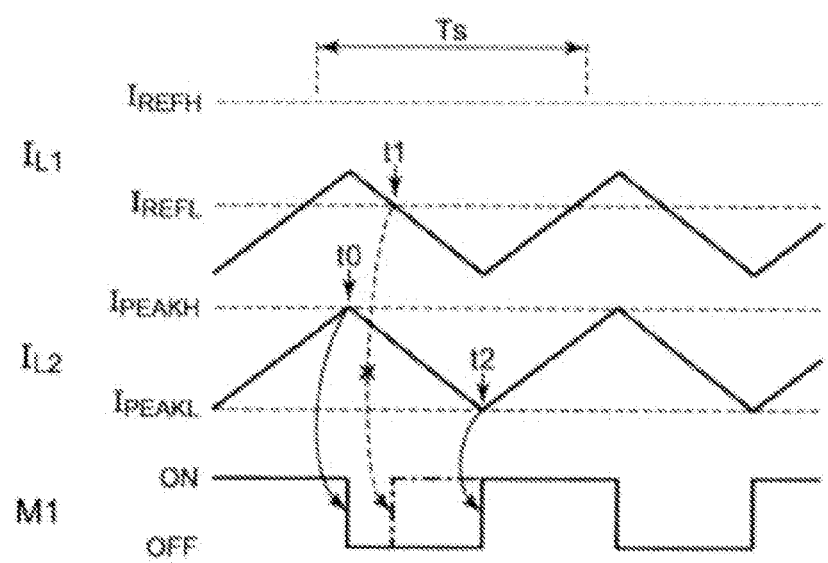
FIG. 4B is operation waveform diagram of the driving device in FIG. 3.

The configuration of the driving device 20 is as described above. Next, the operation of the driving device 20 will be described. FIGS. 4A and 4B are operation waveform diagrams of the driving device 20 in FIG. 3. Referring to FIG. 4A, when focusing on a certain cycle Ts, the switching transistor M1 is turned ON at an initial state and the coil currents $I_{L1}$ and $I_{L2}$ increase. At a point in time t0, the $I_{L1}$ reaches the $I_{REFH}$ before the $I_{L2}$ reaches $I_{PEAKH}$. Therefore, at the point in time t0, the switching transistor M1 is turned OFF. When the switching transistor M1 is turned OFF, the coil currents $I_{L1}$ and $I_{L2}$ begin to decrease. At a point in time t1, the $I_{L2}$ decreases to $I_{PEAKL}$, and then, at a point in time t2, the $I_{L1}$ decreases to $I_{REFL}$. In this case, switching transistor M1 is turned ON at the point in time t2 (solid line), not at the point in time t1 (dashed line). That is, in FIG. 4A, the output current $I_{OUT}$ is stabilized within the target range by the current controller 42 (current control).

Referring to FIG. 4B, when focusing on a certain cycle Ts, the switching transistor M1 is turned ON at an initial state and the coil currents $I_{L1}$ and $I_{L2}$ increase. At a point in time t0, the $I_{L2}$ reaches the $I_{PEAKH}$ before the $I_{L1}$ reaches $I_{REFH}$. Therefore, at the point in time t0, the switching transistor M1 is turned OFF. When the switching transistor M1 is turned OFF, the coil currents $I_{L1}$ and $I_{L2}$ begin to decrease. At a point in time t1, the $I_{L1}$ decreases to $I_{REFL}$, and then, at a point in time t2, the $I_{L2}$ decreases to $I_{PEAKL}$. In this case, switching transistor M1 is turned ON at the point in time t2 (solid line), not at the point in time t1 (dashed line). That is, in FIG. 4B, the input current $I_{L1}$ is limited by the current limiter 44.

The operation of the driving device 20 is as described above.

According to the driving device 20 in FIG. 3, immediately after the first coil current $I_{L1}$ reaches the first upper threshold value $I_{REFH}$ and the switching transistor M1 is turned OFF, even though the second coil current $I_{L2}$ decreases to the second lower threshold value $I_{PEAKL}$, the switching transistor M1 is not turned ON right away, but the OFF state of the switching transistor M1 is continued until the first coil current $I_{L1}$ decreases to the first lower threshold value $I_{REFL}$. On the contrary, immediately after the second coil current $I_{L2}$ reaches the second upper threshold value $I_{PEAKH}$ and the switching transistor M1 is turned OFF, even though the first coil current $I_{L1}$ decreases to the first lower threshold value $I_{REFL}$, the switching transistor M1 is not turned ON right away, but the OFF state of the switching transistor M1 is continued until the second coil current $I_{L2}$ decreases to the second lower threshold value $I_{PEAKL}$. By this control, it is possible to suppress the increase of the switching frequency.

Figure 5:
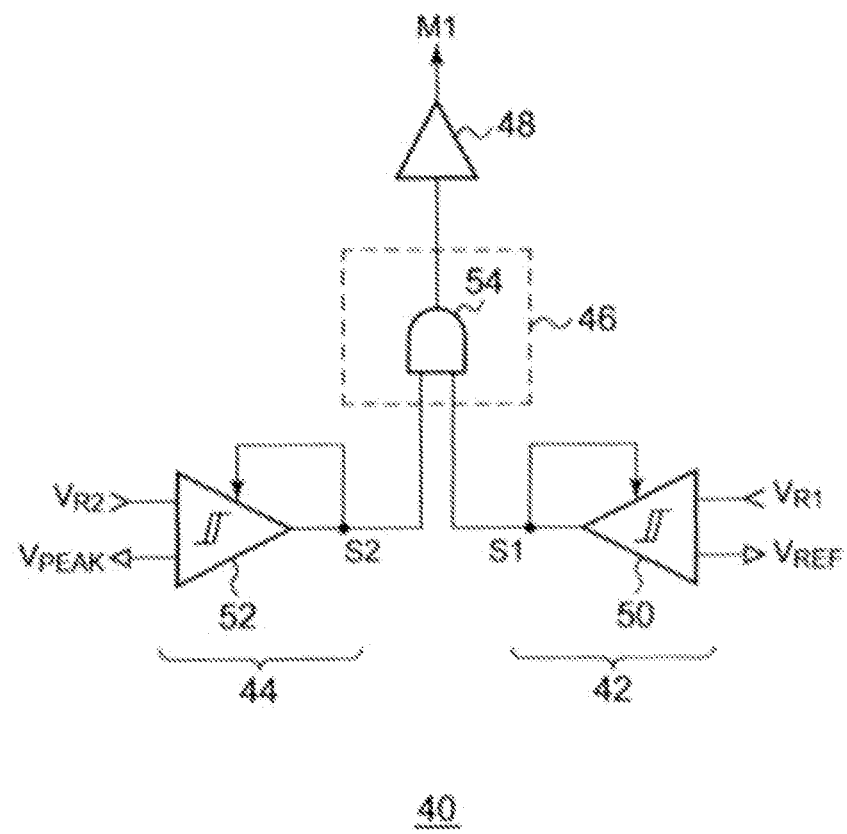
FIG. 5 is a block diagram illustrating a configuration example of a controller.

Next, a specific example of the driving device 20 will be described. FIG. 5 is a block diagram illustrating a configuration example of the controller 40. The current controller 42 includes a first hysteresis comparator 50. The first hysteresis comparator 50 compares the first detected voltage $V_{R1}$ that corresponds to the first coil current $I_{L1}$ with the first threshold voltage value $V_{TH1}$, and asserts (for example, high level) the control signal S1 while the first detected voltage $V_{R1}$ is lower than the first threshold voltage value $V_{TH1}$. By using the hysteresis comparator, the first threshold voltage value $V_{TH1}$ transits at two voltage levels $V_{TH1H}$ and $V_{TH1L}$ which respectively correspond to the first upper threshold value $I_{REFH}$ and the first lower threshold value $I_{REFL}$, and the transition is performed according to the control signal S1 which is the output of the first hysteresis comparator 50.

In addition, the current limiter 44 includes a second hysteresis comparator 52. The second hysteresis comparator 52 compares the second detected voltage $V_{R2}$ that corresponds to the second coil current $I_{L2}$ with the second threshold voltage value $V_{TH2}$, and asserts (for example, high level) the limit signal S2 while the second detected voltage $V_{R2}$ is lower than the second threshold voltage value $V_{TH2}$. By using the hysteresis comparator, the second threshold voltage value $V_{TH2}$ transits at two voltage levels $V_{TH2H}$ and $V_{TH2L}$ which respectively correspond to the second upper threshold value $I_{PEAKH}$ and the second lower threshold value $I_{PEAKL}$, and the transition is performed according to the limit signal S2 which is the output of the second hysteresis comparator 52.

The duty controller 46 includes a logic circuit 54. The logic circuit 54 generates the pulse signal S3 based on the control signal S1 and the limit signal S2. The logic circuit 54 asserts (high level) the pulse signal S3 while the control signal S1 and the limit signal S2 are asserted (high level), and negates the pulse signal S3 while at least one of the control signal S1 and the limit signal S2 is negated. For example, the logic circuit 54 is an AND gate. Those who are skilled in the art may understand that the logic circuit 54 having the same function can be realized by using an inverter, an OR gate, a NOR gate, an XOR gate, or other logic gates as well.

According to the controller 40 in FIG. 5, it is possible to appropriately control the switching transistor M1.

Figure 6A:
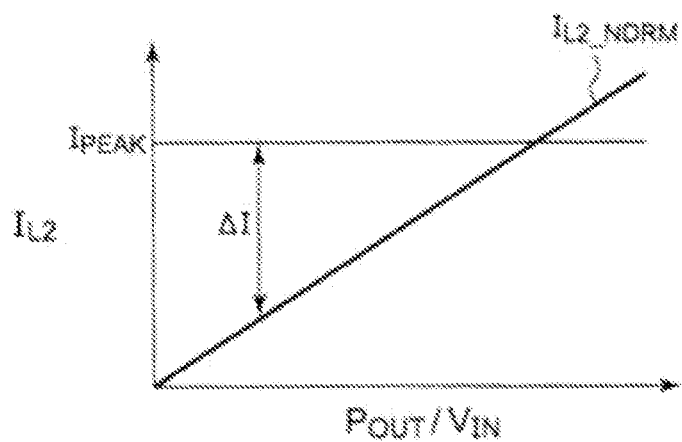
FIG. 6A is diagram explaining a current limit value.
Figure 6B:
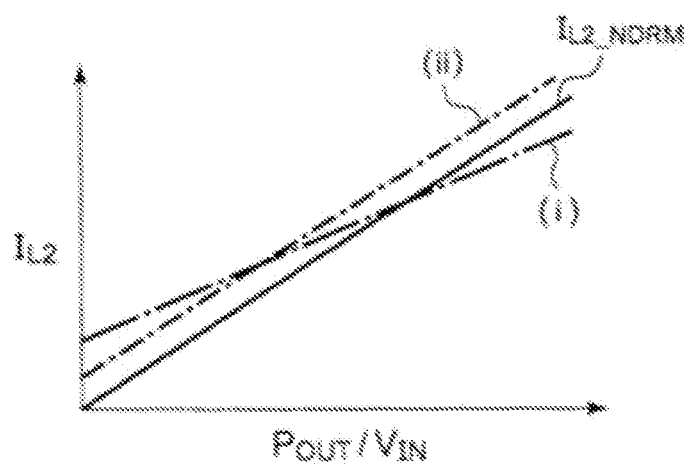
FIG. 6B is diagram explaining a current limit value.

Next, an upper limit value of the current limitation by the current limiter 44 will be described. In the description up to now, the current limit value $I_{PEAK}$ is constant. However, it is preferable that those values vary according to the state of the driving device 20. FIGS. 6A and 6B are diagrams explaining the current limit value $I_{PEAK}$.

In the normal state, second coil current $I_{L2\_NORM}$ flowing in the input inductor L2 can approximate to the $I_{L2\_NORM}=P_{OUT}/V_{IN}$. As illustrated in FIG. 6A, in a case where the current limit value is constant, while the $P_{OUT}/V_{IN}$ decreases, the difference ΔI between the current limit value $I_{PEAK}$ and the second coil current $I_{L2\_NORM}$ at the normal time increases. In a case where ΔI is large, when the current control state is migrated to the current limit state by the changes of the source voltage and the load, the changing amount of the second coil current $I_{L2}$ increases. When the changing amount increases, it becomes easy to enter the oscillation state repeating the current control state and the current limit state, and a degree of oscillation also increases.

In order to solve this problem, as illustrated by dashed lines (i) and (ii) in FIG. 6B, it is preferable to dynamically change the current limit value $I_{PEAK}$. Specifically, it is preferable to increase the current limit value $I_{PEAK}$ in accordance with the second coil current $I_{L2\_NORM}$ at the normal time increasing, in other words, in accordance with $P_{OUT}/V_{IN}$ increasing. In this way, compared to the case in FIG. 6A, the difference ΔI between the current limit value $I_{PEAK}$ and the second coil current $I_{L2\_NORM}$ at the normal time can be decreased, and it is possible to improve an oscillation resistance.

Figure 7:
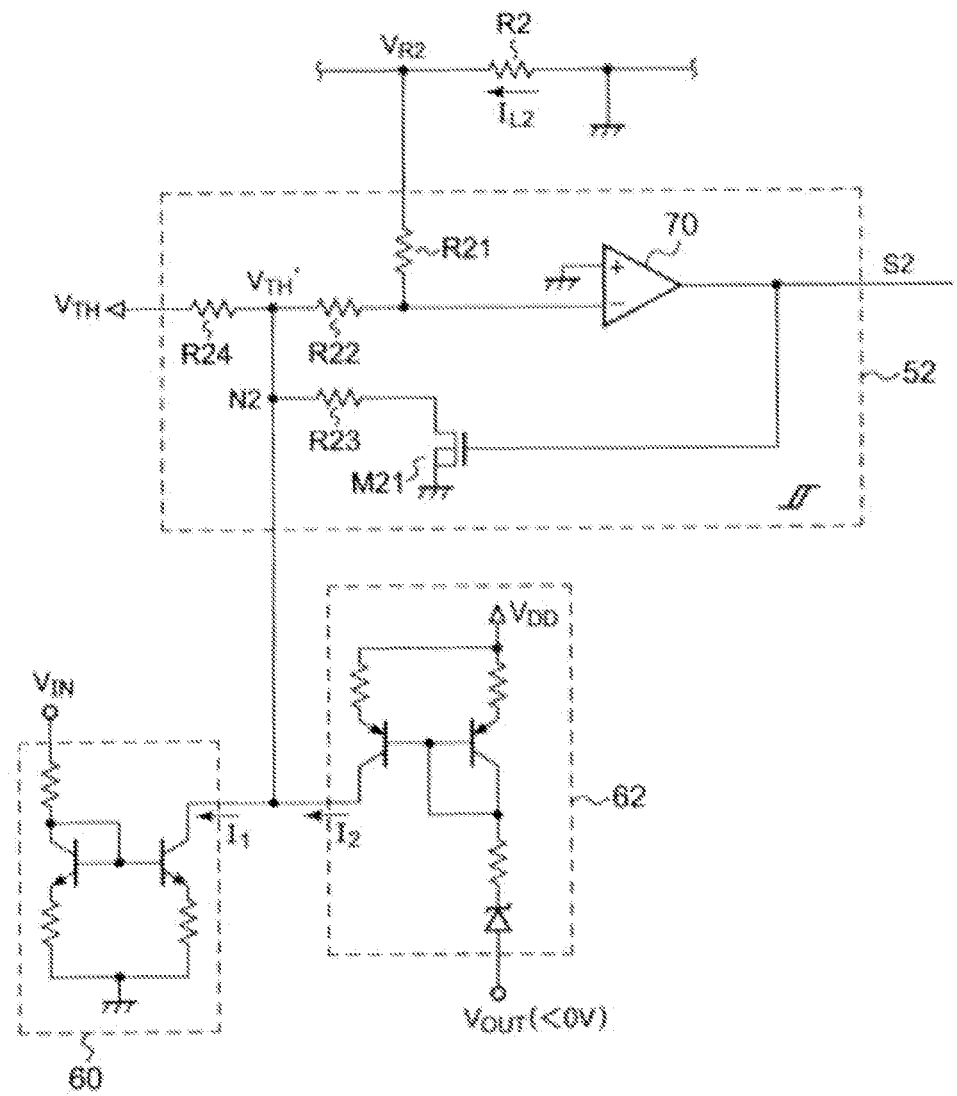
FIG. 7 is a circuit diagram illustrating a configuration example of a current limiter.

FIG. 7 is a circuit diagram illustrating a configuration example of the current limiter 44. If the output current $I_{OUT}$ is assumed to be constant, the output power $P_{OUT}$ is proportional to the output voltage $V_{OUT}$. Therefore, the current limiter 44 causes the current limit value $I_{PEAK}$ to increase in accordance with the output voltage $V_{OUT}$ increasing. In addition, the current limiter 44 causes the current limit value $I_{PEAK}$ to increase in accordance with $1/V_{IN}$ increasing, in other words, in accordance with $V_{IN}$ decreasing.

The current limiter 44 includes a first V/I converter and a second V/I converter in addition to the second hysteresis comparator 52. The second hysteresis comparator 52 compares the detected voltage $V_{R2}$ with voltage threshold value $V_{TH'}$. In this example, $V_{R2}$ is a negative voltage. By comparing $V_{TH'}+V_{R2}$ with 0 volts, the voltage comparator 70 compares $V_{TH'}$ with the absolute value of $V_{R2}$. Resistors 21 and 22 are provided for the voltage addition (averaging).

A transistor M21 and a resistor R23 are provided for setting a hysteresis to the voltage threshold value $V_{TH'}$. The transistor M21 is in ON state when the output of the voltage comparator 70 is in a high level, and is in OFF state when the output of the voltage comparator 70 is in the low level. When transistor M21 is in OFF state, $V_{TH'}$ is equal to $V_{TH}$ and when the transistor M21 is in ON state, $V_{TH'}$ is equal to $V_{TH} \times R23/(R23+R24)$, and transits to the lower threshold value. The configuration of the second hysteresis comparator 52 is not limited to that in FIG. 7, and a well-known hysteresis comparator may be used.

The first V/I converter 60 generates a first current I1 that corresponds to the input voltage $V_{IN}$. The second V/I converter 62 generates a second current I2 that corresponds to the output voltage $V_{OUT}$ of the DC/DC converter. For example, the first V/I converter 60 and the second V/I converter 62 can be configured using a current mirror circuit. The first current I1 increases as the input voltage $V_{IN}$ increases. The second current I2 increases as the output voltage $V_{OUT}$ decreases (as the absolute value of $V_{OUT}$ increases).

The current limiter 44 is configured such that the first hysteresis comparator 50 can be offset according to the first current I1 and the second current I2. The first V/I converter 60 and the second V/I converter 62 supply the current to an appropriate node N2 in the second hysteresis comparator 52, or pull out the current from the node.

In this way, the voltage threshold value $V_{TH'}$ is offset according to the input voltage $V_{IN}$ and the output voltage $V_{OUT}$. Specifically, as the output voltage $V_{OUT}$ increases, the voltage threshold value $V_{TH'}$ increases, and as the input voltage $V_{IN}$ decreases, the voltage threshold value $V_{TH'}$ increases. In this way, as illustrated in FIG. 6B, it is possible to change the current limit value $I_{PEAK}$ according to $P_{OUT}/V_{IN}$. The node N2 that activates the current I1 and the current I2 is not limited to that in FIG. 7 and the position thereof is not limited as long as the node can provide the offset to the second hysteresis comparator 52. For example, the bias current in a voltage comparator 70 may be changed according to the current I1 and the current I2.

Figure 8:
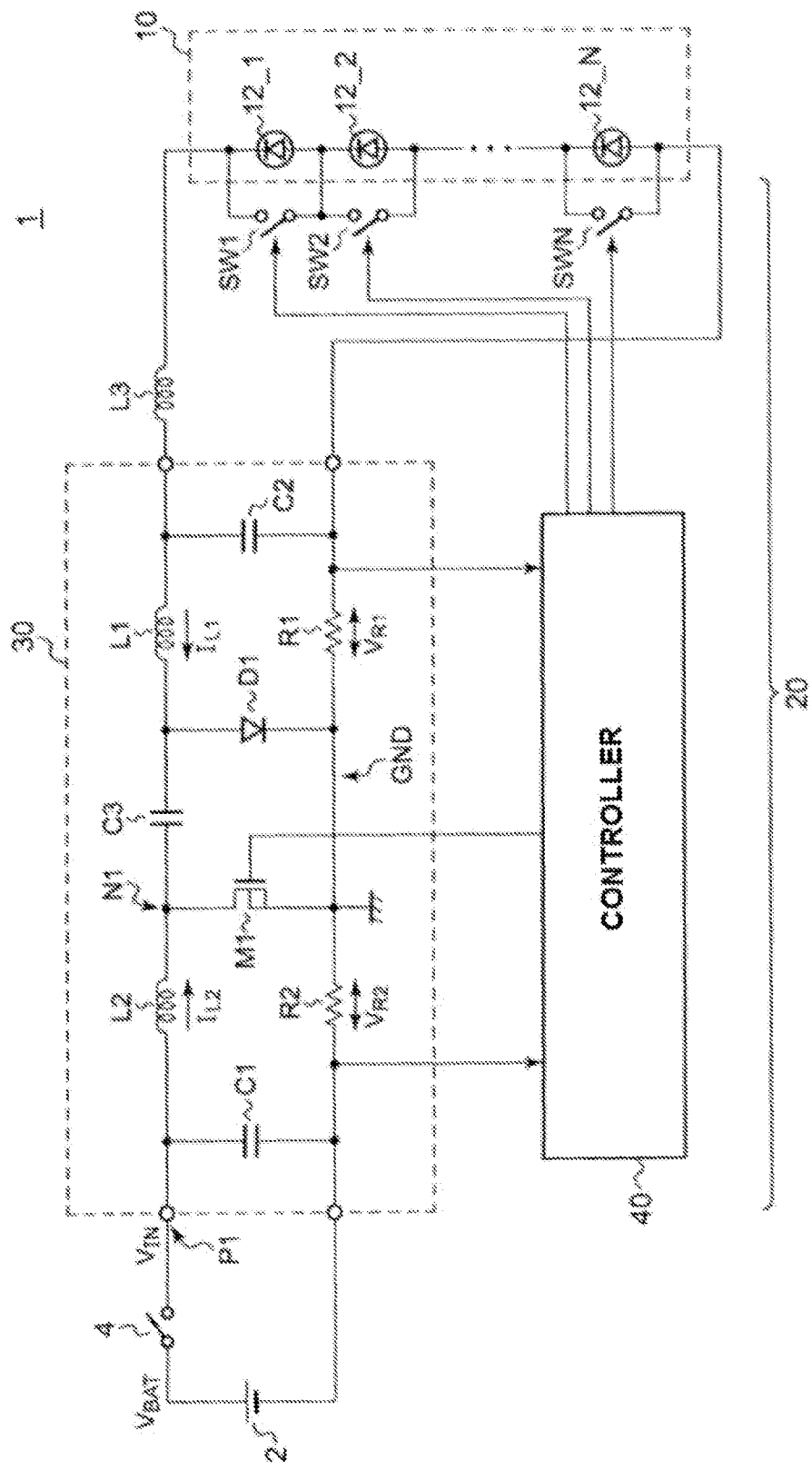
FIG. 8 is a circuit diagram illustrating a configuration example of the vehicle lamp.

Next, a specific configuration example of the vehicle lamp 1 will be described. FIG. 8 is a circuit diagram illustrating the configuration example of the vehicle lamp 1. The light source 10 includes a plurality of (number N) light emitting elements 12 connected in series. The light emitting element 12 is, for example, an LED (a light emitting diode). The DC/DC converter 30 supplies a drive voltage $V_{OUT}$ between the anode and the cathode of the light source 10. An output inductor L3 forms a filter 32 together with the output capacitor C2 of the DC/DC converter 30. By the filter 32, the current $I_{OUT}$ flowing in the light source 10 is smoothed.

The driving device 20 includes a plurality of bypass switches SW1 to SWN in addition to the DC/DC converter 30 and the controller 40. The plurality of bypass switches SW1 to SWN are associated with the plurality of light emitting elements 12_1 to 12_N and are provided in parallel with corresponding light emitting elements respectively.

The output current $I_{OUT}$ of the DC/DC converter 30 is stabilized to the target value by the DC/DC converter 30 and the controller 40. In a state in which all of the bypass switches SW1 to SWN are in OFF state, the output current $I_{OUT}$ comes to flow in all of the light emitting elements 12 and luminance is maximized. When any of the bypass switch SWi is turned OFF, the output current $I_{OUT}$ comes not to flow in the light emitting elements 12_i but flows in the switch SWi side, and the light emitting elements 12_i is turned OFF. The controller 40 controls the luminance or a light distribution of entire vehicle lamp 1 by controlling the ON and the OFF states of the plurality of bypass switches SW1 to SWN.

In the vehicle lamp 1 in FIG. 8, a load fluctuation of the DC/DC converter 30 occurs according to the ON and the OFF states of the bypass switches SW1 to SWN, and the frequency in which the current limit is applied increases. In this case, by using the driving device 20 described above, both the stable current control and the current limit can be achieved.

Figure 9:
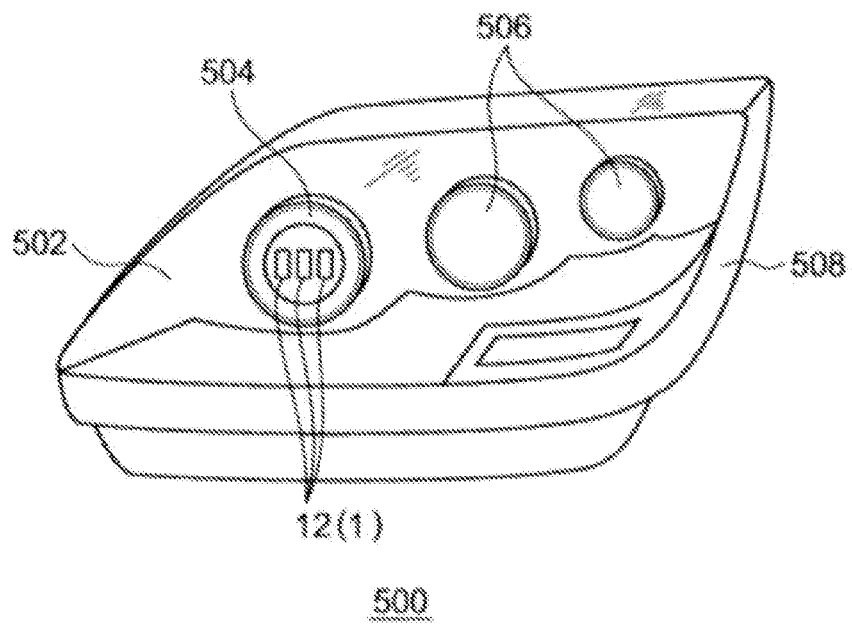
FIG. 9 is a perspective view of a lamp unit (a lamp assembly) that includes the vehicle lamp in FIG. 8.

Lastly, a usage of the vehicle lamp 1 will be described. FIG. 9 is a perspective view of a lamp unit (a lamp assembly) 500 that includes the vehicle lamp 1 in FIG. 8. The lamp unit 500 includes a transparent cover 502, a high-beam unit 504, a low-beam unit 506, and a housing 508. The vehicle lamp 1 described above can be used for the high-beam unit 504, for example. Each of a plurality of light emitting elements 12 is, for example, arranged in a lateral direction in a raw so as to illuminate different areas. Then, in the traveling state of the vehicle, the areas to be illuminated are adaptedly selected by the controller on the vehicle side, for example, by the electronic control unit (ECU). In the vehicle lamp 1, data for instructing the area to be illuminated is input, and the vehicle lamp 1 turns on the light source 10 (light emitting elements 12) corresponding to the instructed area.

As described above, the present invention is described with the embodiment. The present embodiment is an example, and various modification examples can be made to combinations of each configuration element and each processing process. In addition, it should be understood by those skilled in the art that such modification examples are also within the scope of the present invention. Hereinafter, the modification example will be described.

Modification Example 1

Figure 10A:
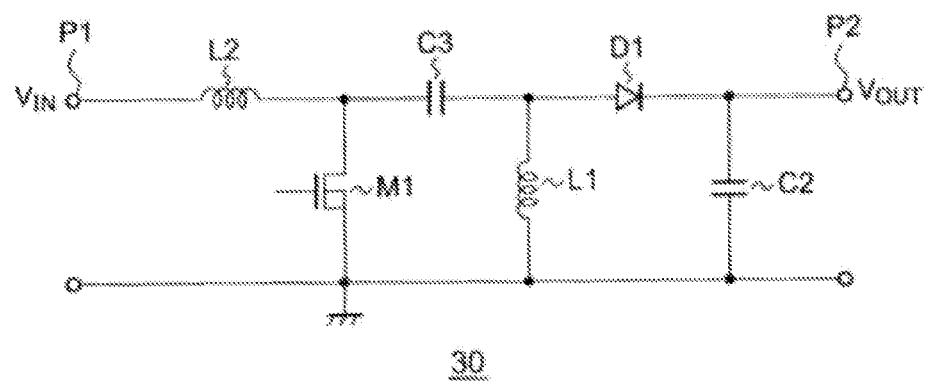
FIG. 10A is circuit diagram of a Sepic converter and a Zeta converter.
Figure 10B:
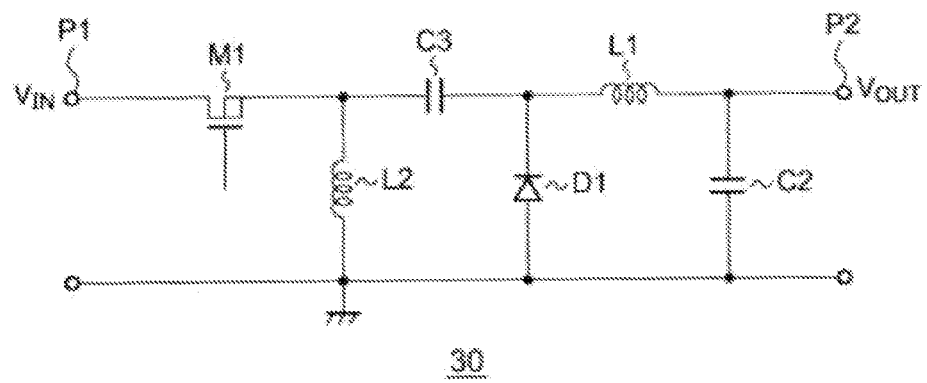
FIG. 10B is circuit diagram of a Sepic converter and a Zeta converter.

In the embodiment, the case where the Cuk converter is used as the DC/DC converter 30 is described, but the present invention is not limited thereto. The DC/DC converter 30 needs to have a topology to include the output inductor L1, the input inductor L2, and the switching transistor M1. In this view point, a Sepic converter or a Zeta converter may be used. FIGS. 10A and 10B are circuit diagrams of Sepic converter and the Zeta converter. The Sepic converter in FIG. 10A has a configuration in which the positions of the rectifier diode D1 and the output inductor L1 in the CUK converter are exchanged. The Zeta converter in FIG. 10B has a configuration in which the positions of the switching transistor M1 and the input inductor L2 in the Cuk converter are exchanged and the direction of the rectifier diode D1 is reversed.

The Cuk, Sepic, and Zeta converters are the same in the point that the series capacitor C3 is provided between an input terminals P1 and an output terminal P2, and the oscillation easily occurs due to the series capacitor C3 compared to the converters having another topology. For controlling the converters, it is very useful to combine the controller 40 which is excellent in stability.

Modification Example 2

The method of detecting the coil currents $I_{L1}$ and $I_{L2}$ is not limited to the method in the embodiment. For example, the sense resistors R1 and R2 may be inserted in another position. Alternatively, instead of the resistors, impedance of the known transistors may be used.

Modification Example 3

In the vehicle lamp 1 in FIG. 8, the case where the plurality of bypass switches SW1 to SWN are associated with all of the light emitting elements 12_1 to 12_N is described, but the present embodiment is not limited thereto. For example, without providing the bypass switches SW, there may exist the light emitting elements 12 that constantly illuminate, or a series circuit having a plurality of light emitting element may be connected in parallel with one bypass switch SW.

Modification Example 4

A laser diode (LD) other than the LED may be used as the light source 10.

Modification Example 5

In the lamp unit 500 in FIG. 9, the case where the vehicle lamp 1 in FIG. 3 is used for the high-beam unit 504 is described. However, as an alternative or in addition to that, the vehicle lamp 1 may be used for the low-beam unit 506.

The present invention is described using specific phrases based on the embodiment. However, the embodiment is merely the example of principles or applications of the present embodiment. In the embodiment, within the range of not departing from the scope and spirit of the present invention defined in the Claims, various modification examples or changes of arrangements can be acceptable.

The invention claimed is:

1. A driving device that is used together with a light source and configures a vehicle lamp, the device comprising:
   a DC/DC converter that receives an input voltage and supplies a drive voltage to the light source; and
   a controller that controls the DC/DC converter,
   wherein the DC/DC converter includes:
   an input terminal, an output terminal, and a ground line;
   a switching transistor and an input inductor that are provided in series between the input terminal and the ground line; and
   an output inductor, and
   wherein the controller includes:
   a current controller that compares a first coil current which flows in the output inductor with a first upper threshold value and a first lower threshold value;
   a current limiter that compares a second coil current which flows in the input inductor with a second upper threshold value and a second lower threshold value; and
   a duty controller that, (i) in a cycle where the first coil current exceeds the first upper threshold value before the second coil current exceeds the second upper threshold value, (i-a) turns OFF the switching transistor triggered by the fact that the first coil current exceeds the first upper threshold value, and (i-b) turns ON the switching transistor triggered by the fact that the first coil current comes below the first lower threshold value, and (ii) in a cycle where the second coil current exceeds the second upper threshold value before the first coil current exceeds the first upper threshold value, (ii-a) turns OFF the switching transistor triggered by the fact that the second coil current exceeds the second upper threshold value, and (ii-b) turns ON the switching transistor triggered by the fact that the second coil current comes below the second lower threshold value.

2. The driving device according to claim 1,
   wherein the current controller includes a first hysteresis comparator that compares the first detected voltage that corresponds to the first coil current with the first threshold voltage value which transits at two voltage levels which respectively correspond to the first upper threshold value and the first lower threshold value, and generates a control signal which is asserted while the first detected voltage is lower than the first threshold voltage value, wherein the current limiter includes a second hysteresis comparator that compares the second detected voltage that corresponds to the second coil current with the second threshold voltage value which transits at two voltage levels which respectively correspond to the second upper threshold value and the second lower threshold value, and generates a limit signal which is asserted while the second detected voltage is lower than the second threshold voltage value, and
   wherein the duty controller includes a logic circuit which generates the pulse signal which is asserted while the control signal and the limit signal are asserted together, and is negated while at least one of the control signal and the limit signal are negated.

3. The driving device according to claim 1,
   wherein, when an output power of the DC/DC converter is $P_{OUT}$ and an input voltage is $V_{IN}$, in accordance with the $P_{OUT}/V_{IN}$ increases, the second upper threshold value and the second lower threshold value increase.

4. The driving device according to claim 2,
   wherein the current limiter further includes:
   a first V/I converter that generates a first current which corresponds to the input voltage $V_{IN}$; and
   a second V/I converter that generates a second current that corresponds to the output voltage $V_{OUT}$ of the DC/DC converter, and
   wherein the current limiter is configured such that the first hysteresis comparator can be offset according to the first current and the second current.

5. The driving device according to claim 1,
   wherein the DC/DC converter further includes a series capacitor that is provided between the input terminal and the output terminal.

6. A vehicle lamp comprising:
   a light source that includes a plurality of light emitting elements connected in series;
   the driving device according to claim 1 that drives the light source; and
   at least one bypass switch that is associated with at least one of the plurality of light emitting elements, and is provided in parallel with corresponding light emitting elements respectively.

7. A control method of a vehicle lamp that includes a light source and a DC/DC converter which receives an input voltage and supplies a drive voltage to the light source,
   wherein the DC/DC converter includes:
   an input terminal, an output terminal, and a ground line;
   a switching transistor and an input inductor that are provided in series between the input terminal and the ground line; and
   an output inductor provided between the input terminal and the output terminal, and
   wherein the control method includes steps of:
   comparing a first coil current which flows in the output inductor with a first upper threshold value and a first lower threshold value;
   comparing a second coil current which flows in the input inductor with a second upper threshold value and a second lower threshold value;
   (i) in a cycle where the first coil current exceeds the first upper threshold value before the second coil current exceeds the upper threshold value, (i-a) turning OFF the switching transistor triggered by the fact that the first coil current exceeds the first upper threshold value, and (i-b) turning ON the switching transistor triggered by the fact that the first coil current comes below the first lower threshold value, and (ii) in a cycle where the second coil current exceeds the second upper threshold value before the first coil current exceeds the first upper threshold value, (ii-a) turning OFF the switching transistor triggered by the fact that the second coil current exceeds the second upper threshold value, and (ii-b) turning ON the switching transistor triggered by the fact that the second coil current comes below the second lower threshold value.

* * * * *